(12) United States Patent
Chao et al.

(10) Patent No.: US 8,135,231 B2
(45) Date of Patent: Mar. 13, 2012

(54) IMAGE PROCESSING METHOD AND DEVICE FOR PERFORMING MOSQUITO NOISE REDUCTION

(75) Inventors: Po-Wei Chao, Taipei Hsien (TW); Hsin-Ying Ou, Hsin-Chu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1125 days.

(21) Appl. No.: 11/865,078

(22) Filed: Oct. 1, 2007

(65) Prior Publication Data

US 2008/0085059 A1    Apr. 10, 2008

(30) Foreign Application Priority Data

Oct. 5, 2006    (TW) ................. 95137015 A

(51) Int. Cl.
*G06K 9/40* (2006.01)
(52) U.S. Cl. .................. 382/268; 382/266; 382/264
(58) Field of Classification Search ............ 382/232, 382/266, 268, 264
See application file for complete search history.

(56) References Cited

U.S. PATENT DOCUMENTS

| | | | |
|---|---|---|---|
| 5,850,294 A * | 12/1998 | Apostolopoulos et al. | 358/426.14 |
| 5,974,197 A * | 10/1999 | Lee et al. | 382/268 |
| 6,188,799 B1 * | 2/2001 | Tan et al. | 382/268 |
| 6,490,008 B1 * | 12/2002 | Harrington | 348/615 |
| 6,668,097 B1 * | 12/2003 | Hu et al. | 382/275 |
| 6,822,675 B2 * | 11/2004 | Jung et al. | 348/180 |
| 7,136,538 B2 * | 11/2006 | Kitagawa | 382/275 |
| 7,155,067 B2 * | 12/2006 | Jayant et al. | 382/268 |
| 7,339,601 B2 * | 3/2008 | Kim | 345/690 |
| 7,551,792 B2 * | 6/2009 | Kong et al. | 382/260 |
| 7,680,355 B2 * | 3/2010 | Chiu et al. | 382/266 |
| 7,801,216 B2 * | 9/2010 | Lee et al. | 375/240.16 |
| 7,865,035 B2 * | 1/2011 | Lin et al. | 382/275 |
| 7,894,685 B2 * | 2/2011 | Zhai et al. | 382/266 |
| 8,023,765 B2 * | 9/2011 | Okumichi et al. | 382/275 |
| 2001/0022857 A1 * | 9/2001 | Kondo et al. | 382/268 |
| 2002/0102029 A1 * | 8/2002 | Sekiguchi et al. | 382/243 |
| 2002/0131647 A1 * | 9/2002 | Matthews | 382/268 |
| 2003/0016879 A1 * | 1/2003 | Slavin | 382/275 |
| 2003/0081854 A1 * | 5/2003 | Deshpande | 382/261 |
| 2004/0081368 A1 * | 4/2004 | Mathew et al. | 382/268 |
| 2004/0165785 A1 * | 8/2004 | Monobe et al. | 382/268 |
| 2004/0208389 A1 * | 10/2004 | Lin | 382/260 |
| 2005/0024651 A1 * | 2/2005 | Yu et al. | 358/1.9 |
| 2005/0078872 A1 * | 4/2005 | Samadani et al. | 382/233 |
| 2005/0147319 A1 * | 7/2005 | Deshpande et al. | 382/268 |
| 2006/0056723 A1 * | 3/2006 | Pan | 382/268 |
| 2007/0076972 A1 * | 4/2007 | Chiu | 382/261 |
| 2009/0148062 A1 * | 6/2009 | Gabso et al. | 382/266 |
| 2009/0310882 A1 * | 12/2009 | Lin et al. | 382/268 |

OTHER PUBLICATIONS

Mosquito noise—metrics, Fenimore et al., SPIE vol. 3959, 0277-786X, 2000, pp. 604-612.*
L. Atzori, et al., "Low-Complexity Post-Processing for Artifact Reduction in Block-DCT Based Video Coding", p. 668-p. 671, IEEE, 2000.

* cited by examiner

*Primary Examiner* — Jayesh A Patel
(74) *Attorney, Agent, or Firm* — Thomas, Kayden, Horstemeyer & Risley, LLP

(57) ABSTRACT

The present invention provides an image processing method for processing an image. The method includes: detecting at least an edge in the image; determining at least a pixel window including the edge; detecting whether a mosquito noise exists in the pixel window; and filtering out the detected mosquito noise in the pixel window.

11 Claims, 4 Drawing Sheets

IMAGE PROCESSING METHOD AND DEVICE FOR PERFORMING MOSQUITO NOISE REDUCTION

BACKGROUND OF THE INVENTION

1. Field of the Invention

The present invention relates to an image processing method and device, and more particularly, to an image processing method and device for filtering out the detected mosquito noise(s) near an edge in an image.

2. Description of the Prior Art

In the technical field of image processing, MPEG (Moving Picture Experts Group) and/or JPEG (Joint Photographic Experts Group) compression is commonly utilized in applications that encode, decode, transmit, store, or play images. Typically, DCT (Discrete Cosine Transform) is performed on the images during compression, thereby causing some problems. For example, some randomly distributed dotted noises may occur in the images during compression due to the fact that the DCT algorithm typically discards high frequency portions of images when processing images. Those noises caused by such a destructive compression algorithm are called mosquito noises.

Conventionally, mosquito noises in the image can be removed by the aid of related compression/decompression information generated during MPEG/JPEG compression. However, due to the variety of image media presently used in the market, it is often hard to know the origin of the image, and it is also hard for a back end device processing the image to get the related compression/decompression information. Thus, how to precisely remove mosquito noises from the image under such condition is certainly a tough issue.

SUMMARY OF THE INVENTION

It is therefore one of the objectives of the present invention to provide an image processing method and device for detecting a mosquito noise near at least an edge in an image and filtering out the detected mosquito noise to solve the above mentioned problems.

The present invention discloses an image processing method for processing an image, comprising: detecting at least an edge in the image; determining at least a pixel window including the edge; detecting whether a mosquito noise exists in the pixel window; and filtering out the detected mosquito noise in the pixel window when the mosquito noise exists in the pixel window.

The present invention also discloses an image processing device for processing an image, comprising: an edge detector, for detecting at least an edge in the image; a mosquito detector, coupled to the edge detector and comprising: a determining unit, for determining at least a pixel window according to the edge; and a detecting unit, for detecting whether a mosquito noise exists in the pixel window; and a mosquito filter, coupled to the edge detector and the mosquito detector, for filtering out the detected mosquito noise when the mosquito noise exists in the pixel window.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
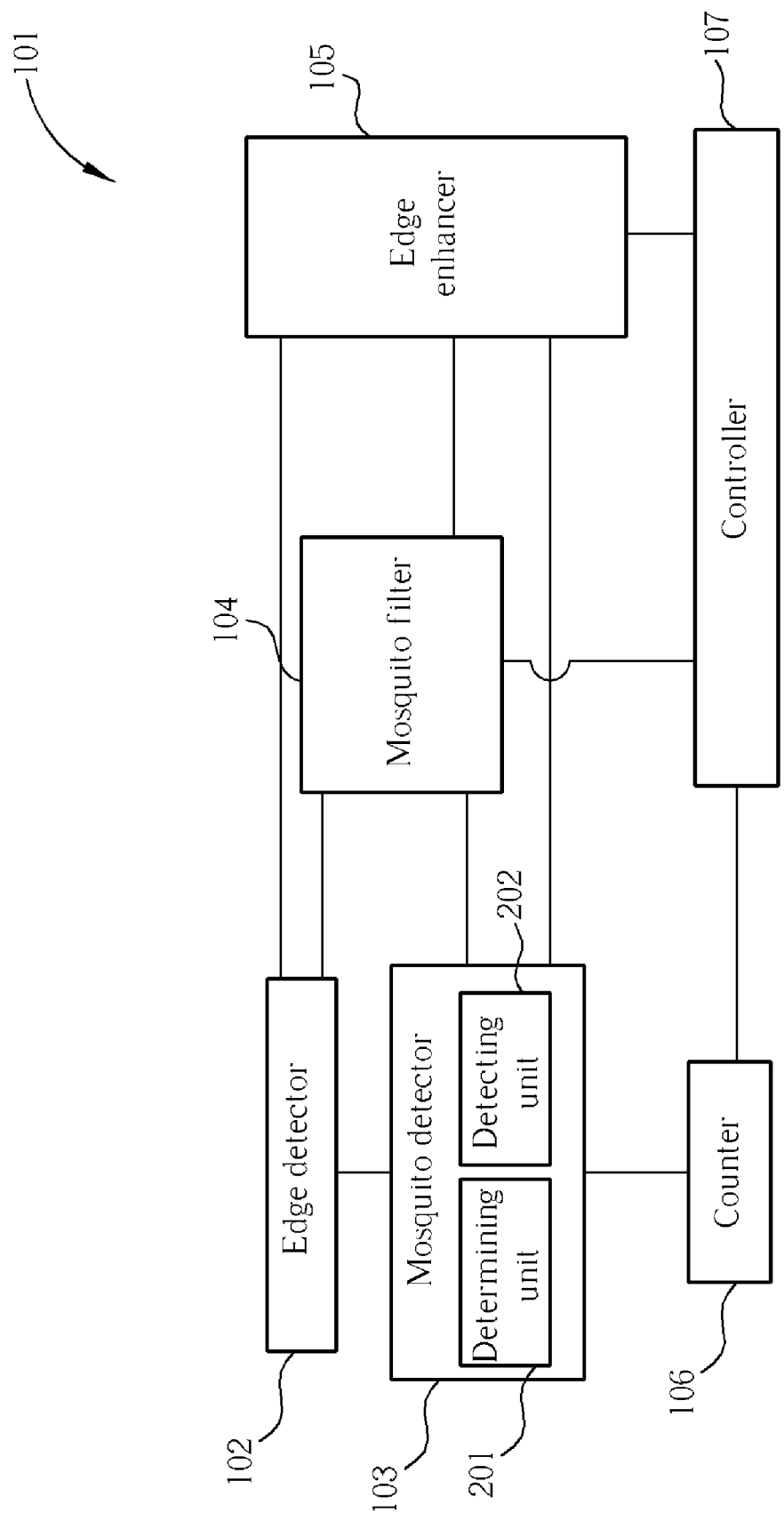
FIG. 1 is a schematic block diagram illustrating an embodiment of an image processing device of the present invention.

Please refer to FIG. 1. FIG. 1 is a schematic block diagram illustrating an preferred embodiment of an image processing device 101 of the present invention. The image processing device 101 is utilized for processing images. In an embodiment of the present invention, the images are digital images comprising a plurality of pixels, and pixel values corresponding to the pixels can be R, G, or B pixel values in a RGB format, brightness or color values in a YUV format, or any other values indicating displaying characteristics of the pixels in other common video formats. As shown in FIG. 1, the image processing device 101 comprises an edge detector 102, a mosquito detector 103, a mosquito filter 104, an edge enhancer 105, a counter 106, and a controller 107. The mosquito detector 103 is coupled to the edge detector 102 for detecting a mosquito noise. The mosquito filter 104 is coupled to the edge detector 102 and the mosquito detector 103 for filtering out the detected mosquito noise. The edge enhancer 105 is coupled to the edge detector 102, the mosquito detector 103, and the mosquito filter 104 for performing an edge enhancing process on a corresponding pixel window after the mosquito filter has filtered out the detected mosquito noise. The counter 106 is coupled to the mosquito detector 103 for counting a total number of the detected mosquito noise(s) in an accumulative manner. The controller 107 is coupled to the mosquito filter 104, the edge enhancer 105, and the counter 106 for controlling the mosquito filter 104 according to the total number. Additionally, in this embodiment, the mosquito detector 103 comprises a determining unit 201 and a detecting unit 202. The determining unit 201 and the detecting unit 202 are coupled to each other. The determining unit 201 determines or creates at least a pixel window including a detected edge. Additionally, according to an embodiment of the present invention, the detecting unit 202 compares the pixel window with at least a target pattern to determine whether the pixel window conforms to the target pattern, thereby deciding whether a mosquito noise exists in the pixel window. The above comparison is not meant to be a limitation of the present invention, however. In other embodiments, the detecting unit 202 can also utilize other detection method.

Figure 2:
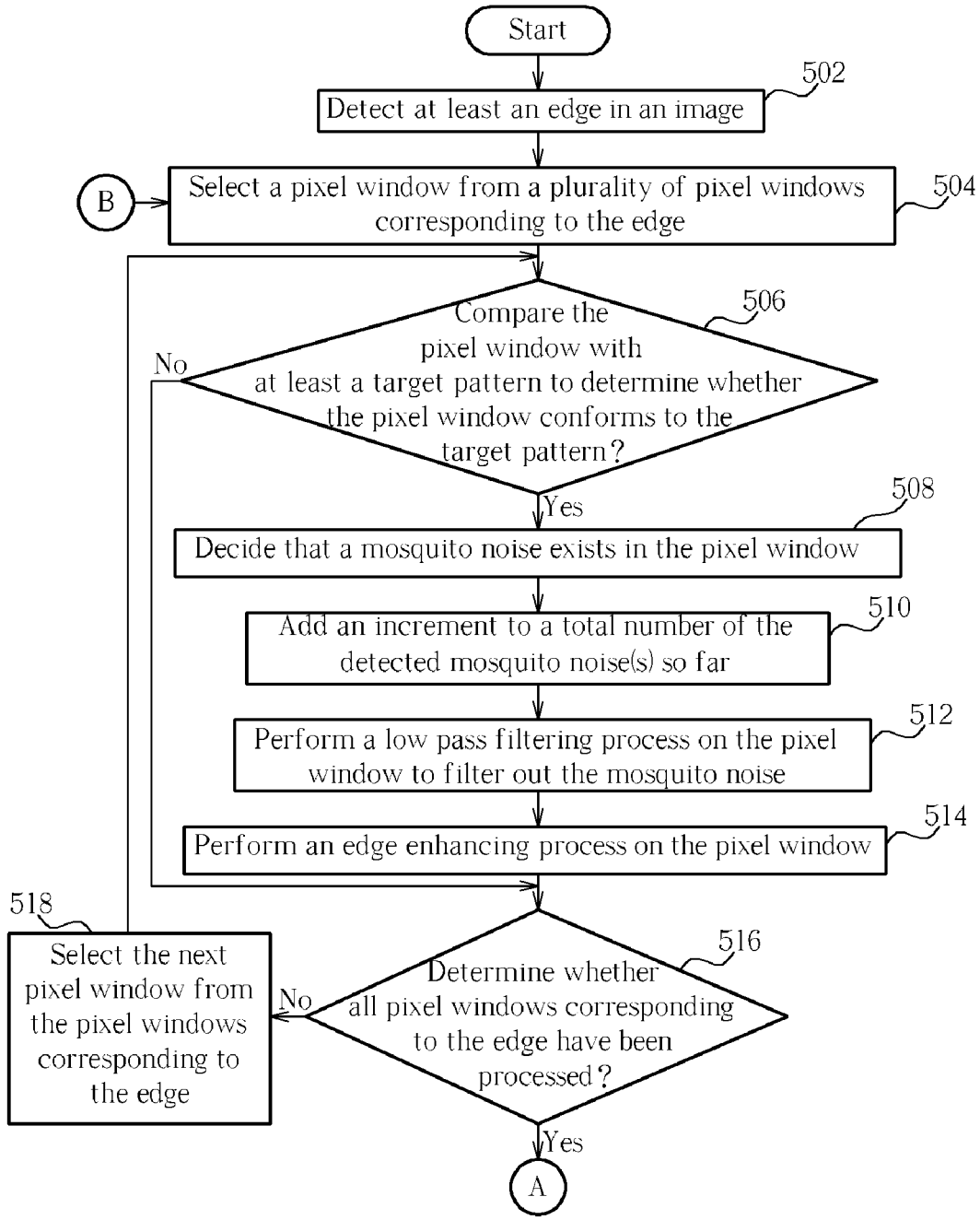
FIG. 2 is a flowchart illustrating an embodiment of an image processing method of the present invention.
Figure 3:
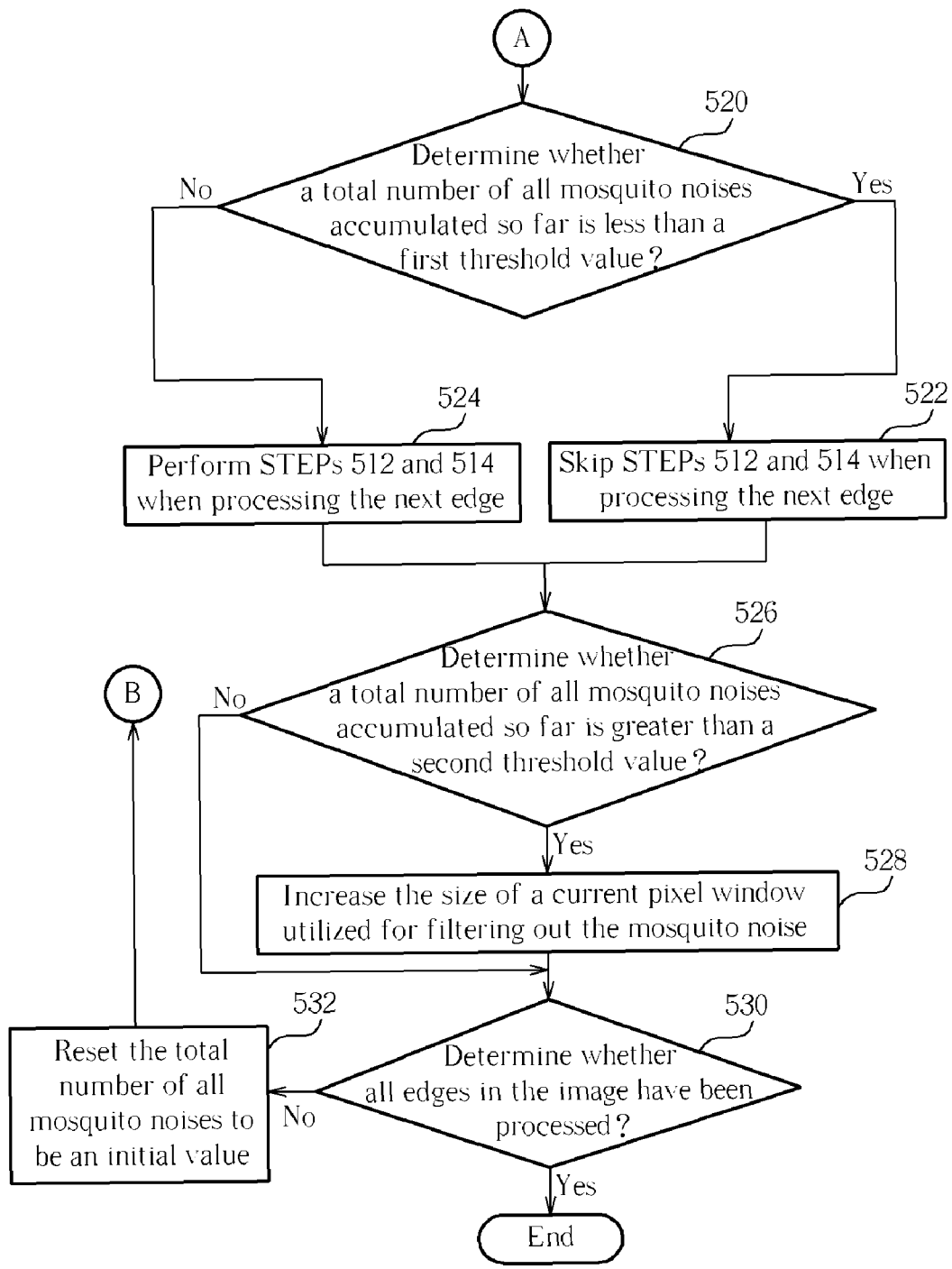
FIG. 3 is a continued flowchart corresponding to FIG. 2.

Please refer to both FIG. 2 and FIG. 3. FIG. 2 is a flowchart illustrating an embodiment of an image processing method of the present invention. FIG. 3 is a continued flowchart corresponding to FIG. 2. As shown in drawings, the image processing method utilized by the image processing device 101 in FIG. 1 comprises the following steps:

STEP 502: Detect at least an edge in an image;

STEP 504: Select a pixel window from a plurality of pixel windows corresponding to the edge to be processed;

STEP 506: Compare the pixel window with at least a target pattern to determine whether the pixel window conforms to the target pattern? If so, proceed to STEP 508; if not, jump to STEP 516;

STEP 508: Decide that a mosquito noise exists in the pixel window;

STEP 510: Add an increment (e.g. 1) to a total number of the detected mosquito noise(s) so far;

STEP 512: Perform a low pass filtering process on the pixel window to filter out the mosquito noise;

STEP 514: Perform an edge enhancing process on the pixel window;

STEP 516: Determine whether all pixel windows corresponding to the edge have been processed? If so, proceed to STEP 520; if not, proceed to STEP 518;

STEP 518: Select the next pixel window from the pixel windows corresponding to the edge, and then return to STEP 506 for processing the next pixel window;

STEP 520: Determine whether a total number of all mosquito noises accumulated so far is less than a first threshold value? If so, proceed to STEP 522; if not, proceed to STEP 524;

STEP 522: Skip STEPs 512 and 514 when processing the next edge;

STEP 524: Perform STEPs 512 and 514 when processing the next edge;

STEP 526: Determine whether a total number of all mosquito noises accumulated so far is greater than a second threshold value? If so, proceed to STEP 528; if not, jump to STEP 530;

STEP 528: Increase the size of a current pixel window utilized for filtering out the mosquito noise;

STEP 530: Determine whether all edges in the image have been processed? If so, end the process herein; if not, proceed to STEP 532; and STEP 532: Reset the total number of all mosquito noises to be an initial value (e.g. 0), and then return to STEP 504 for processing the next edge in the image.

The details as to how the image processing device 101 performs the image processing method as shown in FIG. 2 and FIG. 3 are described as follows. Please note that, edges of real objects in an image processed by a discrete cosine transform (DCT) algorithm often become unclear due to the fact that the DCT algorithm typically discards high frequency portions of images when processing images. For human eyes, some unwanted irregular dots (noises) thus occur near the edges. Roughly speaking, mosquito noises are those unwanted irregular dots occurring near the edges of the real objects in the image. Thus, the first step of the image processing method of the present invention is to find existing edges in an image. Please refer to FIG. 2. First, the edge detector 102 detects at least an edge in an image (STEP 502). Sobel filters and Laplace filters are two common filters for detecting edges. Since Sobel filters and Laplace filters are well known to those skilled in the art, the related description is omitted herein for simplicity. Next, the determining unit 201 of the mosquito detector 103 selects a pixel window from a plurality of pixel windows corresponding to the edge to be processed (STEP 504). Additionally, the pixel windows are formed along the edge. Next, the detecting unit 202 of the mosquito detector 103 compares the pixel window with at least a target pattern to determine whether the pixel window conforms to the target pattern (STEP 506).

Figure 4:
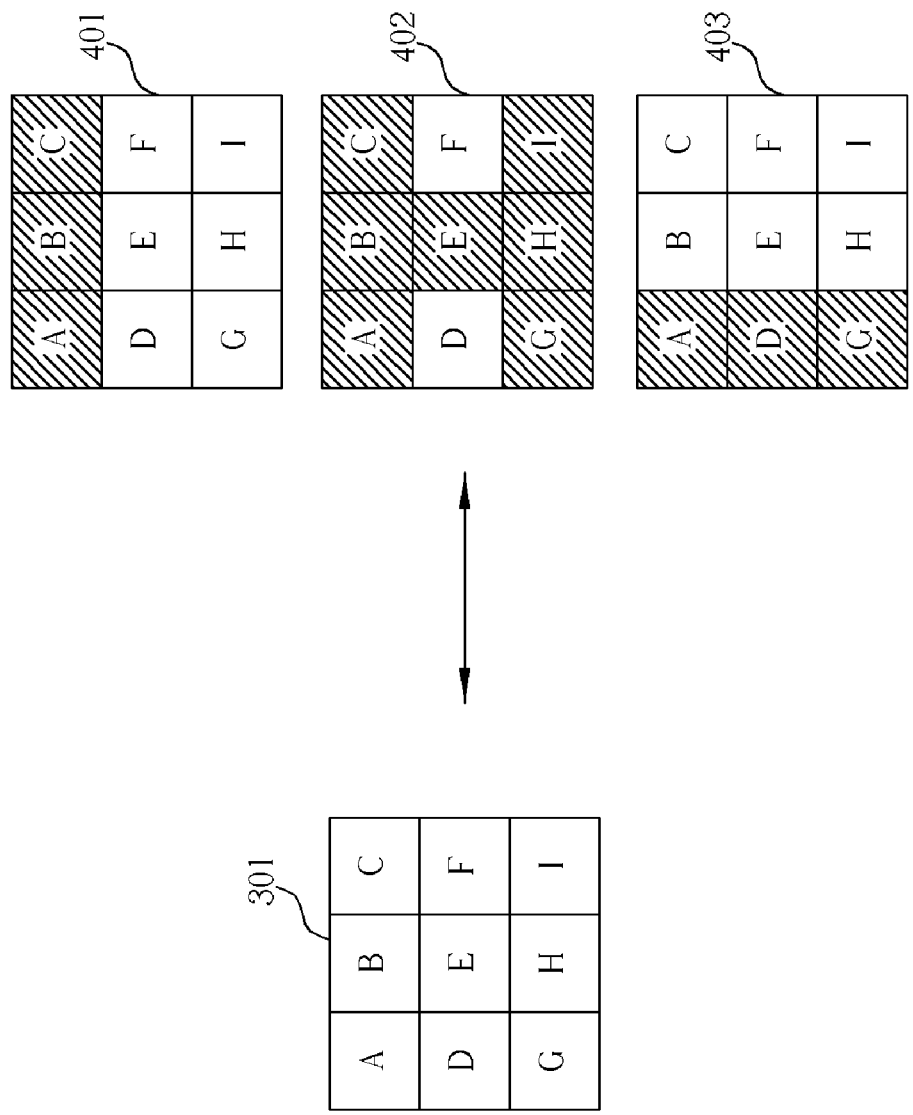
FIG. 4 is a schematic diagram illustrating a pixel window and a plurality of preset patterns.

Please refer to FIG. 4. FIG. 4 is a schematic diagram illustrating a pixel window 301 and a plurality of preset patterns 401, 402, 403. As shown in FIG. 4, the determining unit 201 determines the pixel window 301 by combining a central pixel point E corresponding to the edge detected by the edge detector 102 and 8 surrounding pixel points A, B, C, D, F, G, H, I. Additionally, as described above, pixel values corresponding to the 9 pixel points can be R, G, or B pixel values in a RGB format, brightness or color values in a YUV format, or any other values indicating displaying characteristics of the pixels in other common video formats. The preset pattern 402 out of the preset patterns 401, 402, 403 as shown in FIG. 4 is the target pattern of the present invention. Directions of edges in the preset pattern 402 are very irregular, implying that mosquito noises may exist therein. This is only one of the examples of the present invention, however. In other embodiments, the target pattern can also be defined according to other principles for detecting mosquito noises. For example, in other embodiments, it is decided that mosquito noises exist when the pixel window corresponds to any one of the preset patterns 401, 402, 403. Such an example also falls in the scope of the present invention. As shown in FIG. 4, if the pixel window 301 satisfies a characteristic equation of "A=B=C=D=E=F && G=H=I && A!=G", the pixel window 301 conforms to the preset pattern 401. If the pixel window 301 satisfies a characteristic equation of "A=B=C=E=G=H=I && D=F && A!=D", the pixel window 301 conforms to the target pattern (i.e. the preset pattern 402). If the pixel window 301 satisfies a characteristic equation of "A=D=G=B=E=H && C=F=I && A!=C", the pixel window 301 conforms to the preset pattern 403.

Please note that although the embodiment is exemplified using a 3×3 pixel window having 9 pixels, this is not meant to be a limitation of the present invention. Any other pixel window of other sizes, such as 5×5 and 7×7, falls in the scope of the present invention. Additionally, the preset patterns 401, 402, 403 in FIG. 4 are merely one example and are not meant to be a limitation of the present invention. Other preset patterns having different styles can also be utilized to define the target pattern provided that the principles of the present invention are met.

Please return to FIG. 2. If it is determined in STEP 506 that the pixel window 301 conforms to the target pattern (i.e. the preset pattern 402), the mosquito detector 103 decides that a mosquito noise exists in the pixel window 301 (STEP 508). In other words, a mosquito noise exists near the edge. Additionally, in another embodiment of the present invention, STEP 506 can also be achieved by determining whether the number of major edges that occur most often in a pixel window (having a size of 3×3, 5×5, or 7×7) is greater than half the total number of all edges occurring in the pixel window. If that condition is not established, it means that the edges of the pixel window do not appear a specific directional trend. For example, that condition is not established when directions of the edges are very irregular as shown in the target pattern (i.e. the preset pattern 402) in FIG. 4 of the present invention. In such cases, it is determined that a mosquito noise exists in the pixel window. Please note that, in other embodiments, mosquito noises can also be detected by other methods. For example, a pixel difference filter can also be utilized to determine mosquito noises. Next, the counter 106 adds 1 to a total number of the detected mosquito noise(s) so far (STEP 510). The mosquito filter 104 performs a low pass filtering process on the pixel window 301 to filter out the mosquito noise (STEP 512). Typically, a median filtering process is utilized as the low pass filtering process herein for filtering out high frequency noises with a satisfying result. Additionally, because the computation for filtering out the mosquito noise makes the edge unclear, the edge enhancer 105 will perform an edge enhancing process on the pixel window 301 (STEP 514). Typically, 3×3 Gaussian smoothing filter is utilized as an edge enhancer herein. Please note that, in this embodiment, STEP 512 can be performed either before or after STEP 514, and the same processing result of the present invention can be achieved in either order.

Contrarily, if it is determined in STEP 506 that the pixel window 301 does not conform to the target pattern (i.e. the preset pattern 402), the process jumps to STEP 516. Then, the mosquito detector 103 determines whether all pixel windows corresponding to the edge have been processed (STEP 516).

If it is determined in STEP 516 that the image processing device 101 has not processed all pixel windows, the determining unit 201 of the mosquito detector 103 will select the next pixel window not yet processed from the pixel windows corresponding to the edge (STEP 518). The process then returns to STEP 506 for processing the next pixel window. Additionally, in this embodiment, the image processing method utilizes a pixel window as a basic unit to process an image. In other words, after one pixel window corresponding to an edge in the images has been processed by the above steps (i.e. from STEP 506 to STEP 514), the next pixel window will be processed. Such a procedure will go on until all pixel windows corresponding to the edge in the image have been processed. Please note that the pixel windows are not necessary to be processed in the order as disclosed above.

Contrarily, if it is determined in STEP 516 that all pixel windows corresponding to the edge have been processed, the controller 107 will determine whether a total number of all mosquito noises accumulated so far is less than a first threshold value (STEP 520). If the total number of the mosquito noises so far is less than the first threshold, it means that the detected "mosquito noises" are not real mosquito noises. In other words, the detected "mosquito noises" are just usual noises. In such a case, the controller 107 disables the mosquito filter 104 and the edge enhancer 105 temporarily. Therefore, when the image processing device 101 processes the next edge, STEPs 512 and 514 will be skipped (STEP 522), thereby avoiding image quality deterioration due to unnecessary mosquito noise filtering processes. Please note that those skilled in the art can appropriately design the first threshold value according to the practical requirements (or experimental results) after understanding the principles of the present invention as disclosed above. Contrarily, if the total number of the mosquito noises so far is not less than the first threshold value, the controller 107 will enable the mosquito filter 104 and the edge enhancer 105. Thus, when the image processing device 101 processes the next edge, STEPs 512 and 514 will be performed (STEP 524).

Next, the controller 107 determines whether a total number of all mosquito noises accumulated so far is greater than a second threshold value (STEP 526). If the total number of the mosquito noises so far is greater than the second threshold value, the controller 107 will increases the size of a current pixel window utilized for filtering out the mosquito noise (STEP 528). For example, in this embodiment, the size of the pixel window 301 can be increased from original 3×3 to 11×11 or other values in STEP 528. Please note that those skilled in the art can appropriately design the second threshold value according to the practical requirements (or experimental results) after understanding the principles of the present invention as disclosed above. Contrarily, if the total number of the mosquito noises so far is not greater than the second threshold value, the process will jump to STEP 530. Then, the mosquito detector 103 will determine whether all edges in the image have been processed (STEP 530). If it is determined that all edges in the image have been processed, the whole process will end herein. Contrarily, if it is determined that the image processing device 101 has not processed all edges in the image, the counter 106 will reset the total number of all mosquito noises to be 0 (STEP 532), and then the process will return to STEP 504 for processing the next edge in the image.

In this embodiment, for each edge, the controller 107 does not determine whether the total number of all mosquito noises accumulated so far is less than the first threshold value or greater than the second threshold value unless all pixel windows corresponding to the edge have been processed. This is not meant to be a limitation of the present invention, however. Furthermore, the controller 107 can also determine whether the total number of all mosquito noises accumulated so far is less than the first threshold value or greater than the second threshold value at any other time point during the whole process. For each edge, the controller 107 can determine whether the total number of all mosquito noises accumulated so far is less than the first threshold value or greater than the second threshold value after at least 10 pixel windows have been processed, for example.

The image processing method and device of the present invention can be utilized for filtering out mosquito noises, thereby upgrading image clarity and effectively sharpening edges of real objects in an image. Additionally, the method and device does not need compression/decompression information generated during MPEG (Moving Picture Experts Group) or JPEG (Joint Photographic Experts Group) compression, original images before compression, or any other related information on a temporal basis. In other words, the present invention can be applied to any image for detecting and filtering out mosquito noises whether the image is compressed or not, whether the image is enlarged (e.g. from 8×8 blocks to 16×16 blocks) or not, whether the image is shrunk (e.g. from 16×16 blocks to 8×8 blocks) or not, and whether the image is shifted or not.

Please note that, the techniques and principles of the present invention as disclosed in the above embodiment(s) can be applied to various image processing devices including still picture processing devices, such as digital cameras, and motion video systems, such as LCDs (Liquid Crystal Displays), LCD TVs, and digital TVs. Those skilled in the art can easily apply the present invention to other related technical fields after understanding the techniques and principles of the present invention as disclosed in the above embodiment(s).

Additionally, those skilled in electronic circuit design, digital signal processing, or digital image processing, can also utilize any feasible principles as to hardware circuit design or software programming to accomplish the image processing method and device of the present invention after understanding the techniques and principles of the present invention as disclosed in the above embodiment(s).

Those skilled in the art will readily observe that numerous modifications and alterations of the device and method may be made while retaining the teachings of the invention.

What is claimed is:

1. An image processing method for processing an image, comprising:

detecting at least an edge in the image; creating at least a pixel window including the edge;

detecting whether a mosquito noise exists in the pixel window by:

comparing the pixel window with at least a target pattern so as to determine whether the pixel window conforms to the target pattern; and determining whether the mosquito noise exists in the pixel window based on a degree of conformity of the pixel window to the target pattern; and filtering out the detected mosquito noise in the pixel window when the mosquito noise exists in the pixel window, wherein the filtering operation comprises: counting a total number of the detected mosquito noise(s) in an accumulative manner; and controlling the step of filtering out the detected mosquito noise in the pixel window according to the total number; and varying the size of a current pixel window when the total number is greater than a second threshold value.

2. The method of claim 1, wherein the step of filtering out the detected mosquito noise in the pixel window comprises:
performing a low pass filtering process on the pixel window to filter out the detected mosquito noise.

3. The method of claim 1, further comprising:
performing an edge enhancing process on the pixel window.

4. The method of claim 3, wherein the step of filtering out the detected mosquito noise in the pixel window comprises:
performing a low pass filtering process on the pixel window to filter out the detected mosquito noise after the edge enhancing process has been performed on the pixel window.

5. The method of claim 1, wherein the step of controlling the step of filtering out the detected mosquito noise in the pixel window according to the total number comprises:
pausing the step of filtering out the detected mosquito noise in the pixel window when the total number is less than a first threshold value.

6. The method of claim 1, wherein the step of controlling the step of filtering out the detected mosquito noise in the pixel window according to the total number comprises:
increasing the size of a current pixel window utilized for filtering out the detected mosquito noise in the pixel window when the total number is greater than a second threshold value.

7. An image processing device comprising:
an edge detector, for detecting at least an edge in the image;
a mosquito detector, coupled to the edge detector and comprising:
a determining unit, for determining at least a pixel window including the edge; and a detecting unit, for detecting whether a mosquito noise exists in the pixel window, wherein the detecting unit compares the pixel window with at least a target pattern to determine whether the pixel window conforms to the target pattern, and wherein the mosquito detector determines that the mosquito noise exists in the pixel window based on a degree of conformity of the pixel window conforms to the target pattern; and
a mosquito filter, coupled to the edge detector and the mosquito detector, for filtering out the detected mosquito noise when the mosquito noise exists in the pixel window, wherein the mosquito filter comprises: a counter, coupled to the mosquito detector, for counting a total number of the detected mosquito noise(s) in an accumulative manner; and a controller, coupled to the counter and the mosquito filter, for controlling the mosquito filter according to the total number, wherein the controller varying the size of a current pixel window when the total number is greater than a second threshold value, wherein the device is at least partially embodied in hardware circuitry.

8. The device of claim 7, wherein the mosquito filter performs a low pass filtering process on the pixel window to filter out the detected mosquito noise when the mosquito detector decides that the mosquito noise exists in the pixel window.

9. The device of claim 7, further comprising:
an edge enhancer, coupled to the edge detector and the mosquito filter, for performing an edge enhancing process on the pixel window after the mosquito filter has filtered out the detected mosquito noise.

10. The device of claim 7, wherein the controller disables the mosquito filter when the total number is less than a first threshold value.

11. The device of claim 7, wherein the edge detector is a Sobel detector.

* * * * *